United States Patent [19]

Fahey et al.

[11] 4,454,502

[45] Jun. 12, 1984

[54] APPARATUS FOR MONITORING AND SIGNALLING SYSTEM

[75] Inventors: Robert J. Fahey, Framingham; Martin L. Resnick, Chestnut Hill, both of Mass.

[73] Assignee: United Telecommunications, Inc., Kansas City, Mo.

[21] Appl. No.: 94,242

[22] Filed: Nov. 14, 1979

[51] Int. Cl.³ .................... G08B 29/00; H04M 11/04
[52] U.S. Cl. .................................... 340/507; 340/506; 340/538; 307/128; 307/140; 179/5 R
[58] Field of Search ............................ 340/507–511, 340/516, 521, 526–533, 537, 538, 536, 635, 636, 653, 657–644, 310 R, 310 A, 310 CP; 307/116, 125, 126, 140, 141, 128–131; 179/5 R, 5 P, 2 A, 2 R

[56] References Cited

U.S. PATENT DOCUMENTS

| | | | |
|---|---|---|---|
| 3,808,860 | 4/1974 | King | 340/507 |
| 3,885,235 | 5/1975 | Bergstrom et al. | 340/526 |
| 4,007,456 | 2/1977 | Paige et al. | 340/507 |
| 4,138,670 | 2/1979 | Schneider et al. | 340/507 |

Primary Examiner—Donnie L. Crosland
Attorney, Agent, or Firm—Peter Ziarhos

[57] ABSTRACT

Apparatus for a monitoring and signalling system such as a home health care system. The monitoring and signalling system includes a plurality of ac-based sensors powered by an ac voltage and operative to monitor the occurrence of activities performed by an individual in his or her residence and to produce signals indicative of the occurrence of the monitored activities. Signals produced by the sensors during the presence of the ac voltage are processed by a microprocessor. A loss or absence of the ac voltage and the subsequent restoration of the ac voltage causes the ac-based sensors to produce signals falsely indicating the occurrence of monitored activities. In accordance with the present invention, the microprocessor operates to monitor the state of the ac voltage to detect a loss or absence of the ac voltage and a subsequent restoration thereof and, upon detecting the restoration of the ac voltage, to refuse to accept for processing, for a two-second interval, signals received from the sensors.

23 Claims, 1 Drawing Figure (sheet 2 of 2)

APPARATUS FOR MONITORING AND SIGNALLING SYSTEM

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478, in the names of Robert J. Fahey and Martin L. Resnick, entitled "DATA TRANSMISSION CIRCUIT", and assigned to GTE Sylvania Incorporated and GTE Laboratories Incorporated;

Ser. No. 965,809, filed Dec. 4, 1978, now U.S. Pat. No. 4,220,825, in the name of Robert J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated;

Ser. No. 965,757, filed Dec. 4, 1978, now U.S. Pat. No. Des. 258,577, in the name of Alfred I. Bottner, entitled "Design for SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792, in the name of Robert J. Fahey, entitled "DETECTOR CIRCUIT", and assigned to GTE Sylvania Incorporated;

Ser. No. 25,298, filed Mar. 30, 1979, now U.S. Pat. No. Des. 262,964, in the names of Richard W. Anderson and Alfred I. Bottner, entitled "Design for HOUSING FOR ELECTRONIC CIRCUITRY", and assigned to GTE Sylvania Incorporated;

Ser. No. 75,782, filed Sept. 17, 1979, now U.S. Pat. No. 4,255,669, in the name of Richard L. Naugle, entitled "SENSING APPARATUS", and assigned to GTE Laboratories Incorporated;

Ser. No. 75,769, filed Sept. 17, 1979, now U.S. Pat. No. 4,255,701 in the names of Richard L. Naugle and William L. Geller, entitled "EXIT-ENTRY APPARATUS", and assigned to GTE Laboratories Incorporated;

Ser. No. 94,015, filed concurrently herewith, now U.S. Pat. No. 4,281,394, in the names of Jeffrey R. Fox, Arthur Margolies, Rob Moolenbeek and Martin L. Resnick, entitled "APPARATUS FOR MONITORING AND SIGNALLING SYSTEM", and assigned to GTE Laboratories Incorporated;

Ser. No. 94,018, filed concurrently herewith, now U.S. Pat. No. 4,286,331, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 94,013, filed concurrently herewith, now U.S. Pat. No. 4,303,801, in the names of Richard W. Anderson and J. Edward Schlener, entitled "APPARATUS FOR MONITORING AND SIGNALLING SYSTEM", and assigned to GTE Sylvania Incorporated;

Ser. No. 94,012, filed concurrently herewith, now U.S. Pat. No. 4,304,970, in the names or Robert J. Fahey and Martin L. Resnick, entitled "TELEPHONE STATUS MONITOR APPARATUS", and assigned to GTE Sylvania Incorporated and GTE Laboratories Incorporated;

Ser. No. 94,014, filed concurrently herewith, now U.S. Pat. No. 4,273,960, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 94,245, filed concurrently herewith, now U.S. Pat. No. 4,295,208, in the names of Robert A. Norbedo and Martin L. Resnick, entitled "APPARATUS FOR SIGNALLING SYSTEM", and assigned to GTE Laboratories Incorporated;

Ser. No. 94,241, filed concurrently herewith, now U.S. Pat. No. 4,295,207, in the name of Martin L. Resnick, entitled "DATA PROCESSING APPARATUS FOR RECEIVING AND PROCESSING CODED WORDS", and assigned to GTE Laboratories Incorporated;

Ser. No. 94,016, filed concurrently herewith, now U.S. Pat. No. 4,284,849, in the names of Richard W. Anderson, Robert J. Fahey, William R. McClellan, and J. Edward Schlener, entitled "MONITORING AND SIGNALLING SYSTEM", and assigned to GTE Sylvania Incorporated;

Ser. No. 94,017, filed concurrently herewith, now U.S. Pat. No. 4,273,961, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 94,243, filed concurrently herewith, now U.S. Pat. No. 4,308,430, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 94,019, filed concurrently herewith, now U.S. Pat. No. 4,259,548, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 94,244, filed concurrently herewith, now U.S. Pat. No. 4,360,890, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 94,246, filed concurrently herewith, now U.S. Pat. No. 4,301,515, in the names of Robert J. Fahey, Robert A. Norbedo and Martin L. Resnick, entitled "VARIABLE TIMING SYSTEM", and assigned to GTE Sylvania Incorporated and GTE Laboratories Incorporated.

The following co-pending applications are directed to apparatus which may be employed in the signalling and monitoring system of the present invention:

Ser. No. 75,783, filed Sept. 17, 1979, now U.S. Pat. No. 4,259,594 in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 84,976, filed Oct. 15, 1979, now U.S. Pat. No. 4,307,465, in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical facilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electromechanical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be use to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residence for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer timer period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ½ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center from which communication with the individual may be attempted and/or help sent or summoned.

Another system which has been proposed heretofore for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residences while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include handshaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors, or the like capable of performing significant and substantial data processing, either within the residences of individuals or at central locations. As a result, these systems are susceptible to a high false alarm rate and reliability problems, these latter problems being especially exascerbated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), ordinarily require service personnel to enter a person's home and check out the entire system or a major part thereof to pinpoint the particular source of trouble or malfunction. Further, in those systems employing timers having one or more resettable time periods (e.g., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off-/hook transitions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

BRIEF SUMMARY OF THE INVENTION

In accordance with the present invention, apparatus is provided for a monitoring and signalling system such as a home health care system. The apparatus in accordance with the invention includes an ac-powered sensor means and a signal detection and processing means. The ac-powered sensor means is powered by an ac voltage and is operative to monitor the occurrence of an activity and in response to monitoring the occurrence of the activity and in the presence of an ac voltage to produce a signal indicative of the occurrence of the activity. Each such signal produced by the ac-powered sensor means while the ac voltage is present is received and processed by the signal detection and processing means.

In the event of a power failure or other absence or loss of ac voltage, the ac-powered sensor means is susceptible upon restoration of the ac voltage to produce a signal indicative of the occurrence of the activity monitored by the ac-powered sensor means. Since this signal does not reflect the actual occurrence of an activity monitored by the sensor means, it is necessary to prevent processing of this signal. In accordance with the present invention, the signal detection and processing means operates to detect the restoration of the ac voltage following an absence or loss of the ac voltage and, in response thereto, to reject any signals received thereby from the ac-powered sensor means for a predetermined interval of time. Following this interval of time, signals produced by the ac-powered sensor means are again accepted for processing by the signal detection and processing means.

BRIEF DESCRIPTION OF THE DRAWING

Various objects, features and advantages of a monitoring and signalling system in accordance with the present invention will be had from a detailed discussion taken in conjunction with the accompanying drawing in which.

DETAILED DESCRIPTION OF THE INVENTION

Figure 1:
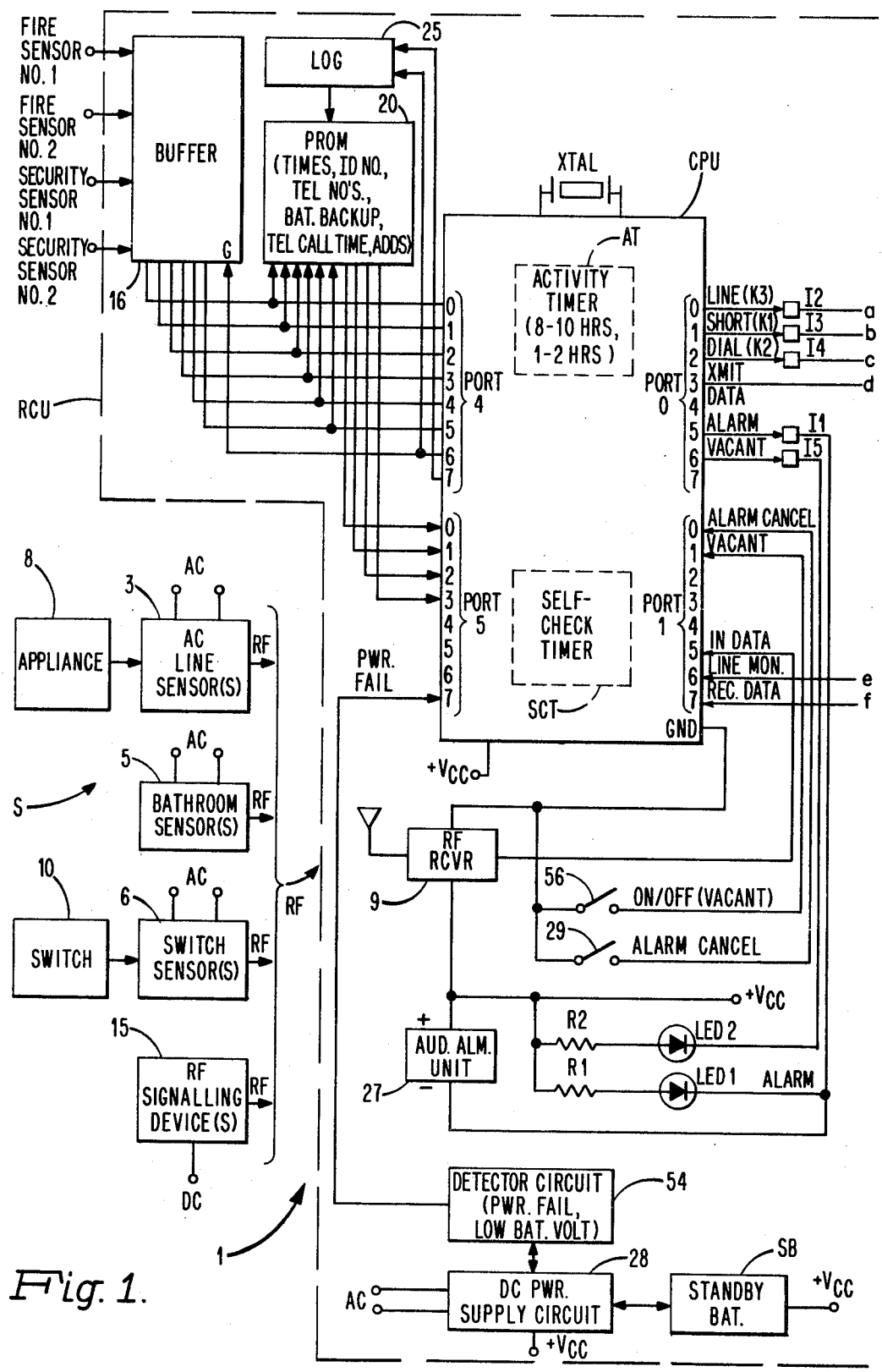
FIG. 1 is a schematic block diagram of a monitoring and signalling system in accordance with the present invention.
Figure 1:
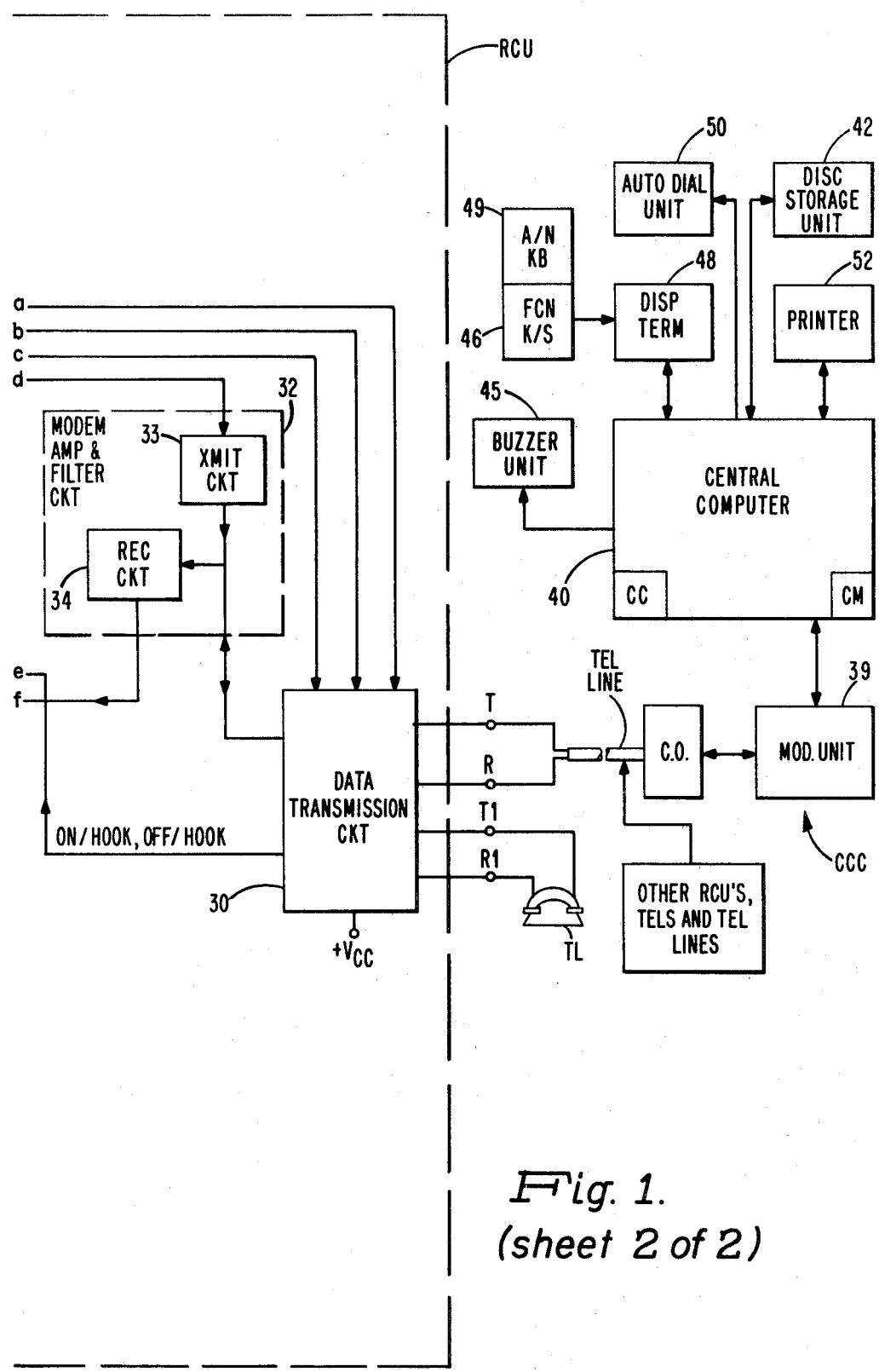

The present invention is described in detail in co-pending patent application Ser. No. 94,019, now U.S. Pat. No. 4,259,548, filed Nov. 14, 1979 in the names of Robert J. Fahey, J. Edward Schlener and Robert A. Norbedo. The following portions of the aforementioned patent are incorporated herein by reference:

(a) FIGS. 2–66 and the corresponding brief description thereof under the heading "BRIEF DESCRIPTION OF THE DRAWING"; and (b) The entire portion of the specification following the heading "DETAILED DESCRIPTION OF THE INVENTION".

What is claimed is:

1. In a monitoring and signalling system, apparatus comprising:

ac-powered sensor means powered by an ac voltage, said ac-powered sensor means being operative to monitor the occurrence of an activity and in response to monitoring the occurrence of the activity and in the presence of an ac voltage to produce a signal indicative of the occurrence of the activity, said ac-powered sensor means being further susceptible to producing a signal indicative of the occurrence of the activity in response to a restoration of ac voltage following an absence of said ac voltage; and signal detection and processing means for receiving and processing signals produced by the ac-powered sensor means, said signal detection and processing means being arranged to detect the presence and absence of the ac voltage and a restoration of the ac voltage following an absence of said voltage and operative when the ac voltage is present to process signals received thereby from the ac-powered sensor means, and further operative when the ac voltage is restored following an absence of the ac voltage to reject any signals received thereby from the ac-powered sensor means for a predetermined interval of time.

2. In a monitoring and signalling system, apparatus comprising:

ac-powered sensor means powered by an ac voltage, said ac-powered sensor means being operative to monitor the occurrence of first and second activities and in response to monitoring the occurrence of either activity and in the presence of an ac voltage to produce a signal indicative of the occurrence of the activity, said ac-powered sensor means being further susceptible to producing a signal indicative of the occurrence of one of the activities in response to a restoration of ac voltage following an absence or loss of said ac voltage;

power detector means operative to detect the state of the ac voltage and to produce a signal having a first value when the ac voltage is present and a second value in the absence or loss of the ac voltage; and processing means arranged to receive signals produced by the ac-powered sensor means and the signal produced by the power detector means, said processing means being operative to take successive samples of the values of the signal produced by the power detector means and when successive samples of said signal have first values indicating the presence of ac voltage to process any signal received thereby from the ac-powered sensor means, and when successive samples of said signal have second and first values indicating the restoration of ac voltage following an absence or loss of the ac voltage to reject any signals produced by the ac-powered sensor means for a predetermined interval of time.

3. Apparatus in accordance with claim 2 wherein the processing means comprises:
sampling means operative to periodically sample the values of the signal produced by the power detector means;
first means operative for each sample of the sampling means having the second value indicating an absence or loss of ac voltage to establish a predetermined interval of time, and for each sample by the sampling means having the first value following a sample having the second value indicating the restoration of the ac voltage following an absence or loss of the ac voltage, to cease the establishing of a further predetermined interval of time;
decrementing means operative to decrement at a predetermined rate each predetermined interval of time established by the first means;
second means operative upon the cessation of the establishing of a further predetermined interval of time of the first means to reject any signals received from the ac-powered sensor means during the predetermined interval of time; and
third means operative at the expiration of the predetermined interval of time to accept for processing signals produced by the ac-powered sensor means.

4. Apparatus in accordance with claim 3 comprising:
first storage means operative to store a predetermined count therein, said count being decremented by the decrementing means;
second storage means;
means operative for each sample by the sampling means having the second value to establish a count in the second storage means having a value related to the predetermined interval of time, said counts in the first and second storage means being selected so as to have related values at the expiration of the predetermined interval of time;
means operative for a sample of the sampling means having the first value and following a sample having the second value to cease the establishing of a further count in the second storage means; and
means operative when the count in the first storage means has been decremented so that the counts in the first and second storage means have the aforesaid related values to reset the second storage means to a count of a predetermined value; and
said third means being operative to examine the count in the second storage means and when the count has the predetermined reset value to accept for processing signals produced by the ac-powered sensor means.

5. Apparatus in accordance with claim 4 wherein:
the predetermined interval of time has a value of two seconds;
the sampling of the sampling means of the signal produced by the power detector means occurs at a millisecond rate; and
the first storage means is decremented by the decrementing means at a rate of once per second.

6. In a monitoring and signalling system, apparatus comprising:
a plurality of ac-powered sensor means each powered by an ac voltage, each of said plurality of ac-powered sensor means being operative to monitor the occurrence of an associated activity and in response to monitoring the occurrence of the associated activity and in the presence of an ac voltage to produce a signal indicative of the occurrence of the activity, each of said plurality of ac-powered sensor means being further susceptible to producing a signal indicative of the occurrence of its associated activity in response to a restoration of ac voltage following an absence of said ac voltage; and
signal detection and processing means for receiving and processing signals produced by the plurality of ac-powered sensor means, said signal detection and processing means being arranged to detect the presence and absence of the ac voltage and a restoration of the ac voltage following an absence of said voltage and operative when the ac voltage is present to process any signals received thereby from any of the plurality of ac-powered sensor means, and further operative when the ac voltage is restored following an absence of the ac voltage to reject any signals receive thereby from any of the plurality of ac-powered sensor means for a predetermined interval of time.

7. In a monitoring and signalling system, apparatus comprising:
a plurality of ac-powered sensor means each powered by an ac voltage, each of said plurality of ac-powered sensor means being operative to monitor the occurrence of different associated first and second activities and in response to monitoring the occurrence of either associated activity and in the presence of an ac voltage to produce a signal indicative of the occurrence of the activity, each of said plurality of ac-powered sensor means being further susceptible to producing a signal indicative of the occurrence of one of its associated activities in response to a restoration of ac voltage following an absence of said ac voltage; and
signal detection and processing means for receiving and processing signals produced by the plurality of ac-powered sensor means, said signal detection and processing means being arranged to detect the presence and absence of the ac voltage and a restoration of the ac voltage following an absence of said voltage and operative when the ac voltage is present to process any signals received thereby from any of the plurality of ac-powered sensor means, and further operative when the ac voltage is restored following an absence of the ac voltage to reject any signals received thereby from any of the plurality of ac-powered sensor means for a predetermined interval of time.

8. In a monitoring and signalling system, apparatus comprising:
a plurality of ac-powered sensor means each powered by an ac voltage, each of said plurality of ac-powered sensor means being operative to monitor the occurrence of different associated first and second activities and in response to monitoring the occurrence of either associated activity and in the presence of an ac voltage to produce a signal indicative of the occurrence of the activity, each of said plurality of ac-powered sensor means being further susceptible to producing a signal indicative of the occurrence of one of its associated activities in response to a restoration of ac voltage following an absence or loss of said ac voltage;
power detector means operative to detect the state of the ac voltage and to produce a signal having a first value when the ac voltage is present and a second value in the absence or loss of the ac voltage; and processing means arranged to receive signals produced by the plurality of ac-powered sensor means and the signal produced by the power detector means, said processing means being operative to take successive samples of the values of the signal produced by the power detector means and when successive samples of said signal have first values indicating the presence of ac voltage to process any signals received thereby from any of the plurality of ac-powered sensor means, and when successive samples of said signal have second and first values indicating the restoration of ac voltage following an absence or loss of the ac voltage to reject any signal produced by any of the plurality of ac-powered sensor means for a predetermined interval of time.

9. Apparatus in accordance with claim 8 wherein the processing means comprises:
sampling means operative to periodically sample the value of the signal produced by the power detector means;
first means operative for each sample of the sampling means having the second value indicating an absence or loss of ac voltage to establish a predetermined interval of time, and for each sample by the sampling means having the first value following a sample having the second value indicating the restoration of the ac voltage following an absence or loss of the ac voltage to cease the establishing of a further predetermined interval of time;
decrementing means operative to decrement at a predetermined rate each predetermined interval of time established by the first means;
second means operative upon the cessation of the establishing of a further predetermined interval of time by the first means to reject any signal received from any of the plurality of ac-powered sensor means during the predetermined interval of time; and
third means operative at the expiration of the predetermined interval of time to accept for processing signals produced by the plurality of ac-powered sensor means.

10. Apparatus in accordance with claim 9 comprising:
first storage means operative to store a predetermined count therein, said count being decremented by the decrementing means;
second storage means;
means operative for each sample by the sampling means having the second value to establish a count in the second storage means having a value related to the predetermined interval of time, said counts in the first and second storage means being selected so as to have related values at the expiration of the predetermined interval of time;
means operative for a sample by the sampling means having the first value and following a sample having the second value to cease the establishing of a further count in the second storage means; and
means operative when the count in the first storage means has been decremented so that the counts in the first and second storage means have the aforesaid related values to reset the second storage means to a count of a predetermined value; and
said third means being operative to examine the count in the second storage means and when the count has the predetermined reset value to accept for processing signals produced by the plurality of ac-powered sensor means.

11. Apparatus in accordance with claim 10 wherein:
the predetermined interval of time has a value of two seconds;
the sampling of the sampling means of the signal produced by the power detector means occurs at a millisecond rate; and
the first storage means is decremented by the decrementing means at a rate of once per second.

12. In a monitoring and signalling system, apparatus comprising:
ac-powered sensor means powered by an ac voltage, said ac-powered sensor means being operative to monitor the occurrence of first and second activities and in response to monitoring the occurrence of either activity and in the presence of an ac voltage to produce a signal indicative of the occurrence of the activity, said ac-powered sensor means being further susceptible to producing a signal indicative of the occurrence of one of the activities in response to a restoration of ac voltage following an absence or loss of said ac voltage, each signal produced by the ac-powered sensor means including data identifying the ac-powered sensor means;
dc-powered sensor means powered by a dc voltage of a dc battery, said dc-powered sensor means being operative to monitor the occurrence of an activity and in response to monitoring the activity to produce a signal indicative of the occurrence of the activity, said signal including data identifying the dc-powered sensor means;
power detector means operative to detect the state of the ac voltage and to produce a signal having a first value when the ac voltage is present and a second value in the absence or loss of the ac voltage;
processing means arranged to receive signals produced by the ac-powered sensor means and the dc-powered sensor means and the signal produced by the power detector means, said processing means comprising:
first means operative to take successive samples of the value of the signal produced by the power detector means;
second means operative when successive samples of the signal produced by the power detector means have first values indicating the presence of ac voltage to process any signal received thereby from the ac-powered sensor means or the dc-powered sensor means;
third means operative for each sample by the first means having the second value indicating an absence or loss of ac voltage to establish a predetermined interval of time, and for each sample by the first means having the first value following a sample having the second value indicating the restoration of the ac voltage following an absence or loss of the ac voltage to cease the establishing of a further predetermined interval of time;
examination means adapted during each established predetermined interval of time following the restoration of ac voltage to examine the sensor identification data in signals produced by the ac-powered sensor means and the dc-powered sensor means, said examination means being operative if a signal examined thereby was received from the ac-powered sensor means during the established predetermined interval of time following the restoration of the ac voltage to prevent further processing of the signal, and further operative if a signal examined thereby was received from the dc-powered sensor means during the established predetermined interval of time following the restoration of the ac voltage to allow further processing of the signal.

13. Apparatus in accordance with claim 12 wherein the examination means comprises:

memory means having storage areas assigned to the ac-powered sensor means and to the dc-powered sensor means and arranged to store data in the storage areas specifying that the ac-powered sensor means is powered by an ac voltage and that the dc-powered sensor means is powered by a dc voltage;

means arranged to access the memory means with the sensor identification data in signals received from the ac-powered sensor means and the dc-powered sensor means during the established predetermined interval of time following the restoration of the dc voltage, said means being operative if a signal is received during the established predetermined interval of time and the corresponding accessed storage area of the memory means specifies that the sensor means producing the signal was the ac-powered sensor means to prevent further processing of the signal, and further operative if a signal is received during the established predetermined interval of time and the corresponding accessed storage area of the memory means specifies that the sensor means producing the signal was the dc-powered sensor means to allow further processing of the signal.

14. Apparatus in accordance with claim 13 wherein: the processing means is powered by a dc voltage; said apparatus further comprising:

power supply circuit means coupled to the processing means, said power supply circuit means being operative to receive an ac voltage and to produce a dc voltage from said ac voltage, said dc voltage being applied to the processing means to power the processing means; and standby battery means in circuit with the power supply circuit means and adapted to be charged by the power supply circuit means;

said power detector means further comprising:

means coupled to the power supply circuit means and to the standby battery means and operative in response to an absence or loss of ac voltage to the power supply circuit means to couple the standby battery means to the processing means to power the processing means following the absence or loss of the ac voltage, whereby the processing means is able to process signals received thereby from the dc-powered sensor means following the absence or loss of the ac voltage.

15. Apparatus in accordance with claim 14 wherein the power detector means further comprises:

means operative to monitor the value of dc voltage of the standby battery means and when the value of the dc voltage is less than a predetermined value to uncouple the standby battery means from the processing means.

16. Apparatus in accordance with claim 13 comprising:

first storage means operative to store a predetermined count therein;

second storage means;

means operative for each sample by the first means having the second value to establish a count in the second storage means having a value related to the predetermined interval of time, said counts in the first and second storage means being selected so as to have related values at the expiration of the predetermined interval of time;

decrementing means operative to decrement the count in the first storage means at a predetermined rate;

means operative for a sample by the first means having the first value and following a sample having the second value to cease the establishing of a further count in the second storage means;

means operative when the count in the first storage means has been decremented so that the counts in the first and second storage means have the aforesaid related values to reset the second storage means to a count of a predetermined value; and means operative to examine the count in the second storage means and when the count has the predetermined reset value to accept for processing signals produced by the ac-powered and dc-powered sensor means.

17. Apparatus in accordance with claim 16 wherein:

the predetermined interval of time has a value of two seconds;

the sampling of the first means of the signal produced by the power detector means occurs at a millisecond rate; and the first storage means is decremented by the decrementing means at a rate of once per second.

18. In a monitoring and signalling system, apparatus comprising:

a plurality of ac-powered sensor means each powered by an ac voltage, each of said ac-powered sensor means being operative to monitor the occurrence of different associated first and second activities and in response to monitoring the occurrence of either associated activity and in the presence of an ac voltage to produce a signal indicative of the occurrence of the activity, each of said ac-powered sensor means being further susceptible to producing a signal indicative of the occurrence of one of its associated activities in response to a restoration of ac voltage following an absence or loss of said ac voltage, each signal produced by each of the ac-powered sensor means including data identifying the ac-powered sensor means;

dc-powered sensor means powered by a dc voltage of a dc battery, said dc-powered sensor means being operative to monitor the occurrence of an activity and in response to monitoring the activity to produce a signal indicative of the occurrence of the activity, said signal including data identifying the dc-powered sensor means;

power detector means operative to detect the state of the ac voltage and to produce a signal having a first value when the ac voltage is present and a second value in the absence or loss of the ac voltage;

processing means arranged to receive signals produced by the plurality of ac-powered sensor means and the dc-powered sensor means and the signal produced by the power detector means, said processing means comprising:

first means operative to take successive samples of the value of the signal produced by the power detector means;

second means operative when successive samples of the signal produced by the power detector means have first values indicating the presence of ac voltage to process any signal received thereby from an ac-powered sensor means or from the dc-powered sensor means;

third means operative for each sample of the first means having the second value indicating an absence or loss of ac voltage to establish a predetermined interval of time, and for each sample by the first means having the first value following a sample having the second value indicating the restoration of the ac voltage following an absence or loss of the ac voltage to cease the establishing of a further predetermined interval of time; and examination means adapted during each established predetermined interval of time following the restoration of ac voltage to examine the sensor identification data in signals produced by the plurality of ac-powered sensor means and the dc-powered sensor means, said examination means being operative if a signal examined thereby was received from an ac-powered sensor means during the established predetermined interval of time following the restoration of the ac voltage to prevent further processing of the signal, and further operative if a signal examined thereby was received from the the dc-powered sensor means during the established predetermined interval of time following the restoration of the ac voltage to allow further processing of the signal.

19. Apparatus in accordance with claim 18 wherein the examination means comprises:

memory means having storage areas assigned to the plurality of ac-powered sensor means and to the dc-powered sensor means and arranged to store data in the storage areas specifying that each of the plurality of ac-powered sensor means is powered by an ac voltage and that the dc-powered sensor means is powered by a dc voltage; and means arranged to access the memory means with the sensor identification data in signals received from an ac-powered sensor means and dc-powered sensor means during the established predetermined interval of time following the restoration of the ac voltage, said means being operative if a signal is received during the established predetermined interval of time and the accessed storage area of the memory means specifies that the sensor means producing the signal was an ac-powered sensor means to prevent further processing of the signal, and further operative if a signal is received during the established predetermined interval of time and the accessed storage area of the memory means specifies that the sensor means producing the signal was the dc-powered sensor means to allow further processing of the signal.

20. Apparatus in accordance with claim 19 wherein: the processing means is powered by a dc voltage; said apparatus further comprising:

power supply circuit means coupled to the processing means, said power supply circuit means being operative to receive an ac voltage and to produce a dc voltage from said ac voltage, said dc voltage being applied to the processing means to power the processing means; and standby battery means in circuit with the power supply circuit means and adapted to be charged by the power supply circuit means;

said power detector means further comprising:

means coupled to the power supply circuit means and to the standby battery means and operative in response to an absence or loss of ac voltage to the power supply circuit means to couple the standby battery means to the processing means to power the processing means, whereby the processing means is able to process signals received thereby from the dc-powered sensor means following the absence or loss of the ac voltage.

21. Apparatus in accordance with claim 20 wherein the power detector means further comprises:

means operative to monitor the value of dc voltage of the standby battery means and when the value of the dc voltage is less than a predetermined value to uncouple the standby battery means from the processing means.

22. Apparatus in accordance with claim 20 comprising:

first storage means operative to store a predetermined count therein;

second storage means;

means operative for each sample by the first means having the second value to establish a count in the second storage means having a value related to the predetermined interval of time, said counts in the first and second storage means being selected so as to have related values at the expiration of the predetermined interval of time;

decrementing means operative to decrement the count in the first storage means at a predetermined rate;

means operative for a sample of the first means having the first value and following a sample having the second value to cease the establishing of a further count in the second storage means;

means operative when the count in the first storage means has been decremented so that the counts in the first and second storage means have the aforesaid related values to reset the second storage means to a count of a predetermined value; and means operative to examine the count in the second storage means and when the count has the predetermined reset value to accept for processing signals produced by the ac-powered and dc-powered sensor means.

23. Apparatus in accordance with claim 22 wherein:

the predetermined interval of time has a value of two seconds;

the sampling of the first means of the signal produced by the power detector means occurs at a millisecond rate; and the first storage means is decremented by the decrementing means at a rate of once per second.

* * * * *